United States Patent
Sakota et al.

(10) Patent No.: US 12,258,876 B2
(45) Date of Patent: Mar. 25, 2025

(54) ELECTRIC TURBOCHARGER WITH COOLING PASSAGES

(71) Applicant: IHI Corporation, Tokyo (JP)

(72) Inventors: Koji Sakota, Tokyo (JP); Yuji Sasaki, Tokyo (JP); Shun Nakayama, Tokyo (JP)

(*) Notice: Subject to any disclaimer, the term of this patent is extended or adjusted under 35 U.S.C. 154(b) by 50 days.

(21) Appl. No.: 18/322,600

(22) Filed: May 24, 2023

(65) Prior Publication Data

US 2023/0296031 A1 Sep. 21, 2023

Related U.S. Application Data

(63) Continuation of application No. PCT/JP2022/000560, filed on Jan. 11, 2022.

(30) Foreign Application Priority Data

Feb. 10, 2021 (JP) .................... 2021-019660

(51) Int. Cl.
*F01D 25/12* (2006.01)
*F01D 25/14* (2006.01)

(52) U.S. Cl.
CPC ............ *F01D 25/12* (2013.01); *F01D 25/14* (2013.01); *F05D 2220/40* (2013.01)

(58) Field of Classification Search
CPC .......... F01D 25/12; F01D 25/14; F04D 25/06; F04D 29/5806; F05D 2220/40; F02B 37/04; F02B 37/10; F02B 39/00; F02B 39/10; H02K 7/14; H02K 9/223
See application file for complete search history.

(56) References Cited

U.S. PATENT DOCUMENTS

| | | | | |
|---|---|---|---|---|
| 10,844,779 B2* | 11/2020 | Hehn | ................ | F04D 25/024 |
| 11,913,473 B2* | 2/2024 | Chavez Castellanos | ................ | |
| | | | | F04D 29/584 |
| 2009/0101087 A1* | 4/2009 | Ueno | ................ | F01D 25/16 |
| | | | | 123/41.31 |
| 2014/0354089 A1* | 12/2014 | Chamberlin | ........... | H02K 5/203 |
| | | | | 310/54 |
| 2014/0354090 A1* | 12/2014 | Chamberlin | ........... | H02K 5/203 |
| | | | | 310/54 |
| 2015/0337850 A1* | 11/2015 | An | ................ | F04D 29/284 |
| | | | | 417/423.13 |

(Continued)

FOREIGN PATENT DOCUMENTS

| | | | | |
|---|---|---|---|---|
| EP | 3623597 B1 * | 12/2023 | ........... | F01D 25/125 |
| JP | 2007-292041 | 11/2007 | | |

(Continued)

OTHER PUBLICATIONS

Translation EP-3623597-B1 (Year: 2024).*

(Continued)

*Primary Examiner* — J. Todd Newton
(74) *Attorney, Agent, or Firm* — SOFI PATENT & LAW FIRM

(57) ABSTRACT

An electric turbocharger includes an electric motor including a stator disposed annularly about a rotation axis, a first member thermally coupled with a first end face of the stator and forming a first cooling passage that extends around the rotation axis, and a second member thermally coupled with a second end face of the stator and accommodating a second cooling passage that extends around the rotation axis.

20 Claims, 7 Drawing Sheets

(56) References Cited

U.S. PATENT DOCUMENTS

| | | | |
|---|---|---|---|
| 2016/0028292 A1* | 1/2016 | Lin | H02K 5/203 |
| | | | 310/64 |
| 2017/0271956 A1* | 9/2017 | Hanumalagutti | H02K 9/197 |
| 2018/0216633 A1 | 8/2018 | Makino et al. | |
| 2020/0080470 A1* | 3/2020 | Hehn | F01D 25/125 |
| 2021/0156299 A1* | 5/2021 | Houst | H02K 9/08 |
| 2021/0156449 A1* | 5/2021 | Nejedly | F04D 25/082 |

FOREIGN PATENT DOCUMENTS

| | | | | |
|---|---|---|---|---|
| JP | 2010-196478 | | 9/2010 | |
| JP | 2016-200020 | | 12/2016 | |
| JP | 2017-150339 | | 8/2017 | |
| JP | 2018-145813 | | 9/2018 | |
| WO | WO-2013176853 A1 * | 11/2013 | | F01D 25/14 |
| WO | 2014/080501 | | 5/2014 | |

OTHER PUBLICATIONS

Translation WO-2013176853-A1 (Year: 2024).*
International Preliminary Report on Patentability with Written Opinion dated Aug. 24, 2023 for PCT/JP2022/000560.
International Search Report dated Mar. 22, 2022 for PCT/JP2022/000560.

* cited by examiner

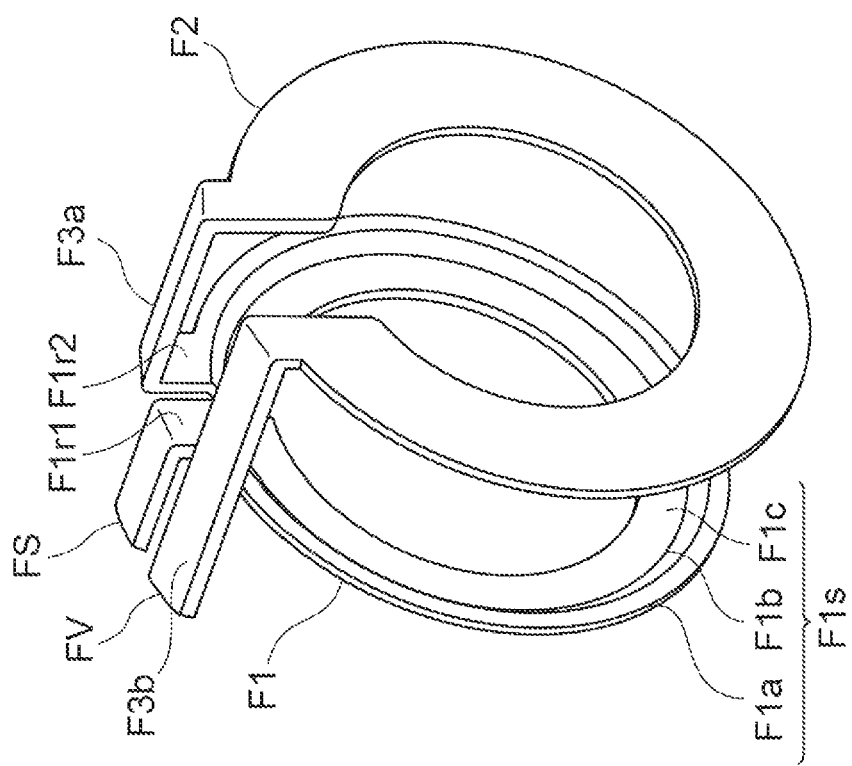
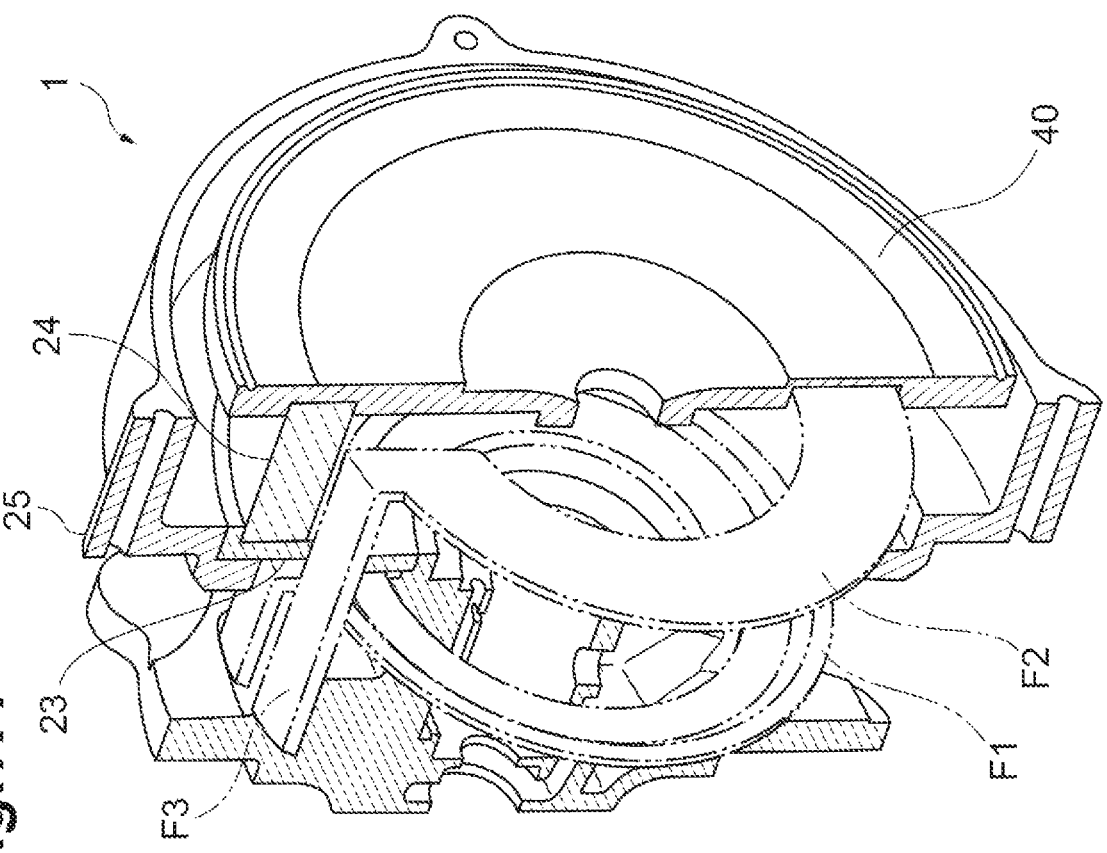

ELECTRIC TURBOCHARGER WITH COOLING PASSAGES

CROSS-REFERENCE TO RELATED APPLICATIONS

This application is a continuation application of PCT Application No. PCT/JP2022/000560, filed on Jan. 11, 2022, which claims the benefit of priority from Japanese Patent Application No. 2021-019660, filed on Feb. 10, 2021, the entire contents of which are incorporated herein by reference.

BACKGROUND

An electric turbocharger causes a compressor impeller to rotate by an electric motor. The compressor impeller compresses air. The compressed air becomes hot. The electric motor that rotates the compressor impeller is a heat source.

The temperature of the components constituting the electric turbocharger rises due to the heat of the compressed air and the heat of the electric motor.

The rise in temperature may affect the performance of the electric turbocharger.

Japanese Unexamined Patent Publication No. 2010-196478 discloses a cooling structure for cooling an electric motor and a turbine.

Japanese Unexamined Patent Publication No. 2017-150339 discloses a cooling structure for cooling the rear face of a compressor impeller.

SUMMARY

An example electric turbocharger includes an electric motor having a stator disposed on a circumference about an axis of rotation, a first member thermally connected (e.g., thermally coupled) to a first end face of the stator in a direction of the axis of rotation; a second member thermally connected (e.g., thermally coupled) to a second end face of the stator in the direction of the axis of rotation; and a third member in contact with the first member. The first member and the third member cooperate to form a first passage substantially surrounding the axis of rotation and disposed on a side of the first end face. The second member has a second passage substantially surrounding the axis of rotation, disposed on a side of the second end face, and spaced from the first passage in the direction of the axis of rotation.

BRIEF DESCRIPTION OF DRAWINGS

FIGS. 7A and 7B are diagrams schematically illustrating an example of a passage.

DETAILED DESCRIPTION

Figure 1:
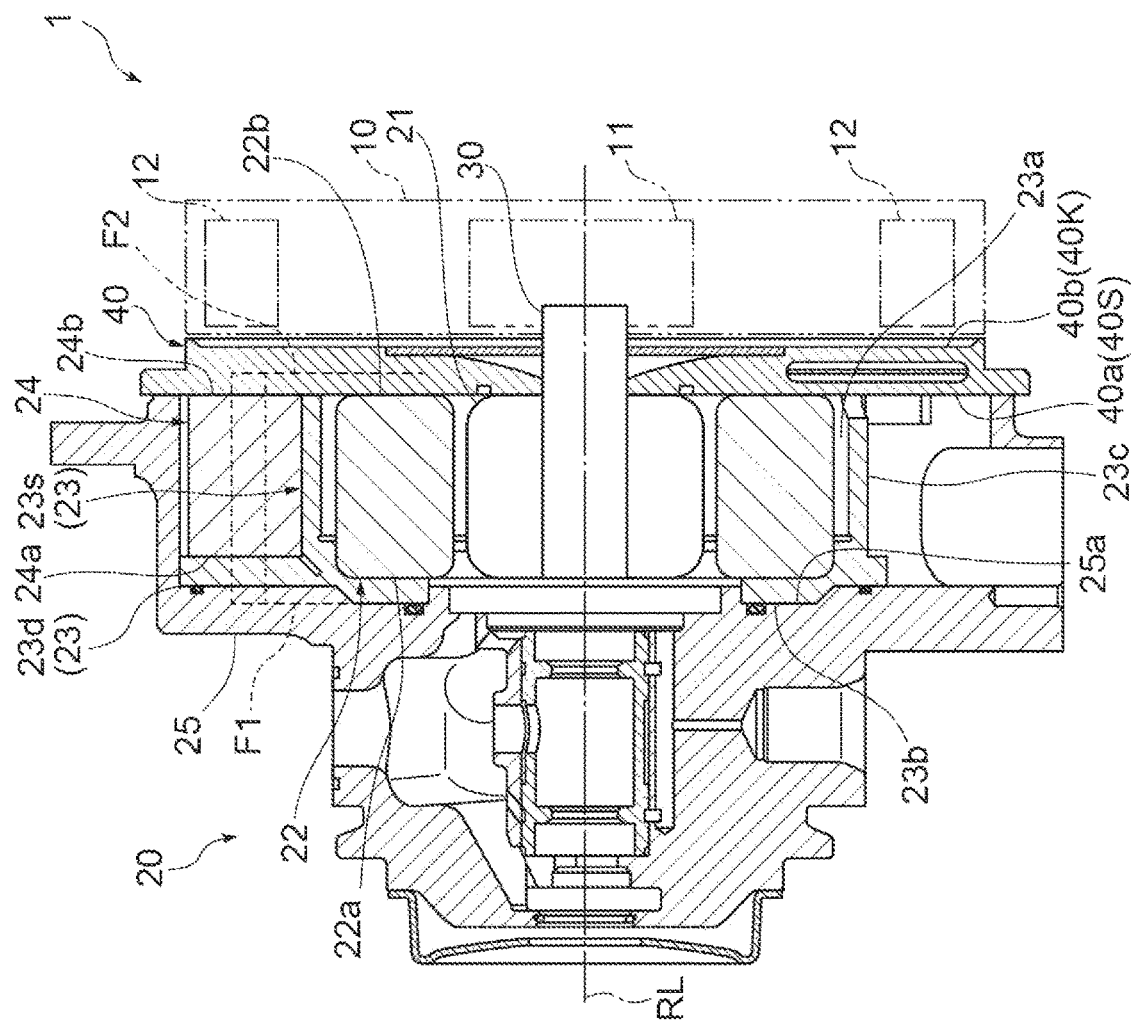
FIG. 1 is a cross-sectional view schematically illustrating a configuration of an example electric turbocharger.

An example electric turbocharger includes an electric motor having a stator disposed on a circumference about an axis of rotation, a first member thermally connected (e.g., thermally coupled) to a first end face of the stator in a direction of the axis of rotation; a second member thermally connected (e.g., thermally coupled) to a second end face of the stator in the direction of the axis of rotation; and a third member in contact with the first member. The first member and the third member cooperate to form a first passage substantially surrounding the axis of rotation and disposed on a side of the first end face. The second member has a second passage substantially surrounding the axis of rotation, disposed on a side of the second end face, and spaced from the first passage in the direction of the axis of rotation.

An electric current for generating a rotating magnetic field is supplied to the stator of the example electric turbocharger. The stator generates heat due to the supplied electric current. The first member is thermally connected to the first end face of the stator. The first member and the third member cooperate to form the first passage. The example electric turbocharger enables heat to be removed from the first end face of the stator by supplying a cooling medium (or heat transfer medium) to the first passage. The second member is thermally connected to the second end face of the stator. The second member has the second passage. The example electric turbocharger enables heat to be removed from the second end face of the stator by supplying a cooling medium (or heat transfer medium) to the second passage. The example electric turbocharger thus enables a larger amount of heat to be removed from the stator. As a result, the example electric turbocharger is capable of further increasing cooling performance.

The second member may be a diffuser plate. The first member may be a stator case holding the stator. The third member may be a motor casing containing the stator case.

The stator case may have a case body containing the stator, and a case rib extending from an outer circumferential surface of the case body. The example electric turbocharger may further include a path block disposed between the case rib and the diffuser plate, which are separated by the case body. The path block may have a coupling passage connecting the first passage and the second passage to each other. The coupling passage of the path block connects the first passage to the second passage. As a result, the example electric turbocharger enables the passages that cool the first end face and the second end face of the stator to be formed as one passage. The example electric turbocharger thus also enables the configurations for providing the cooling medium (or heat transfer medium) to the passage and discharging the cooling medium from the passage to be simple.

The path block may further have an introduction passage configured to direct the cooling medium to the second passage from outside. The coupling passage may be configured to direct the cooling medium from the second passage to the first passage. Even with this configuration, the example electric turbocharger enables the configurations for providing the cooling medium to the passage and discharging the cooling medium from the passage to be simple.

A second projection area of the second passage viewed from the axis of rotation may be different from a first projection area of the first passage viewed from the axis of rotation. This configuration enables the example electric turbocharger to adjust the balance between the amount of heat to be removed from the stator by the first passage and the amount of heat to be removed from the stator by the second passage.

A second projection area of the second passage viewed from the axis of rotation may be larger than a first projection area of the first passage viewed from the axis of rotation.

This configuration enables the example electric turbocharger to increase the amount of heat to be removed from the stator by the second passage to greater than the amount of heat to be removed from the stator by the first passage.

The first passage may include an inner passage portion substantially surrounding the axis of rotation, an outer passage portion substantially surrounding the axis of rotation and offset relative to the inner passage portion in the direction of the axis of rotation, and an intermediate passage portion provided between the inner passage portion and the outer passage portion, and extending obliquely relative to the direction of the axis of rotation. This configuration enables the example electric turbocharger to favorably remove heat from the first end face of the stator.

The first passage has a passage body portion including the inner passage portion, the intermediate passage portion, and the outer passage portion, a first accessory passage portion extending from one end of the passage body portion in a direction intersecting the axis of rotation, and a second accessory passage portion extending from the other end of the passage body portion in the direction intersecting the axis of rotation. A distance from the one end of the passage body portion to the other end of the passage body portion around the axis of rotation may be smaller than a distance from the first accessory passage portion to the second accessory passage portion. This configuration enables the example electric turbocharger to more favorably remove heat from the first end face of the stator.

Hereinafter, with reference to the drawings, the same elements or similar elements having the same function are denoted by the same reference numerals, and redundant description will be omitted.

FIG. 1 is a cross-sectional view schematically illustrating a configuration of an example electric turbocharger 1. As illustrated in FIG. 1, the electric turbocharger 1 includes a compressor 10, an electric motor 20, and a rotating shaft 30. The electric turbocharger 1 drives the compressor 10 by the electric motor 20 powered by electrical power. The electric turbocharger 1 discharges compressed air. The electric turbocharger 1 causes the compressor 10 to rotate by recovering the energy of exhaust gas by a turbine. The electric turbocharger 1 assists rotational torque by disposing the electric motor 20 on the rotating shaft 30.

The compressor 10 receives power from the electric motor 20 via the rotating shaft 30. The compressor 10 draws in air by an impeller 11 that rotates around the rotating shaft 30. The compressor 10 compresses the air drawn in. The compressed air is discharged via a scroll passage 12 provided inside the compressor 10.

The electric motor 20 drives the compressor 10. The electric motor 20 has a rotor 21, a stator 22, a stator case 23 (first member), a path block 24, and a motor casing 25 (third member).

The rotor 21 is fixed to the rotating shaft 30. The rotor 21 has a substantially cylindrical shape. The rotor 21 surrounds a circumference of the rotating shaft 30. The rotor 21 rotates together with the rotating shaft 30. The rotor 21 includes, for example, a plurality of permanent magnets.

The stator 22 surrounds an outer circumferential surface of the rotor 21. The stator 22 has a substantially tubular shape. Teeth are formed on an inner circumferential surface of the stator 22. A coil is wound around the teeth. The coil faces the outer circumferential surface of the rotor 21. An electric current is supplied to the coil of the stator 22. When an electric current is supplied to the coil, the rotor 21 rotates. The stator 22 has a first end face 22a and a second end face 22b. The first end face 22a faces a bottom face of the stator case 23. The second end face 22b faces a diffuser plate 40 (second member). A coil end which is an end of the coil is exposed at the first end face 22a. A coil end which is an end of the coil is also exposed at the second end face 22b. The coil end is disposed in a vicinity of an outer circumference of the first end face 22a, for example, in an annular shape. The coil end is also disposed in a vicinity of an outer circumference of the second end face 22b, for example, in an annular shape.

The stator case 23 holds the stator 22. The stator case 23 has a case body 23s and a case rib 23d. The case body 23s has a substantially tubular shape. The stator 22 is fixed inside the case body 23s. A case opening 23a is formed at one end of the case body 23s. The case opening 23a is closed by the diffuser plate 40. The other end of the case body 23s is closed by a case end face 23b. A circumferential wall 23c of the case body 23s surrounds an outer circumferential surface of the stator 22. The plate-like case rib 23d is provided on an end of the circumferential wall 23c on the case end face 23b side. The case rib 23d is continuous with the case end face 23b. The case rib 23d projects outward of the case body 23s. The case rib 23d is disposed between the path block 24 and the motor casing 25 described below. The case rib 23d is in contact with the path block 24. The case rib 23d is also in contact with the motor casing 25.

The stator case 23 is thermally connected (or thermally coupled) to the first end face 22a of the stator 22. Thermally connected or coupled refers to a state in which the thermal conductivity between the stator case 23 and the first end face 22a is higher than the thermal conductivity of air. An example is a state in which the stator case 23 is physically in contact with the first end face 22a. Another example is a state in which a gap between the stator case 23 and the first end face 22a is filled with a thermally conductive material such as thermal grease.

The path block 24 has a block-like shape. The path block 24 is a separate body from the stator case 23. The path block 24 has a block main face 24a and a block rear face 24b. The block main face 24a is in contact with the case rib 23d. The block rear face 24b is in contact with the diffuser plate 40. The path block 24 has, for example, two through holes formed therein. The through holes pass from the block main face 24a to the block rear face 24b. The path block 24 is disposed between the case rib 23d of the stator case 23 and the diffuser plate 40. The path block 24 has at least one curved surface that has a curvature which matches that of the circumferential wall 23c. The curved surface of the path block 24 is in contact with the circumferential wall 23c. The path block 24 is disposed between the stator case 23 and the diffuser plate 40. The path block 24 is disposed on a side surface of the stator case 23. The two through holes formed in the path block 24 are closed by the case rib 23d and the diffuser plate 40.

The motor casing 25 contains the stator case 23 and the path block 24. The motor casing 25 is in contact with the stator case 23. The motor casing 25 has a substantially circular container-like shape. The motor casing 25 has a wall face 25a. The wall face 25a faces the case end face 23b of the stator case 23. The wall face 25a is in contact with the case end face 23b.

A first passage F1 for a cooling medium (or heat transfer medium) is formed in the motor casing 25. In one example, a groove and a hole for the first passage F1 are formed in the motor casing 25. The motor casing 25 is in watertight contact with the stator case 23 to seal the first passage F1. The motor casing 25 cooperates with the stator case 23 to form the first passage F1. The first passage F1 allows a cooling medium such as cooling water to flow therethrough. As a result, the first end face 22*a* of the stator 22 is cooled.

The diffuser plate 40 is a disc-like component. The diffuser plate 40 has a motor-side main face 40*a* and a compressor-side rear face 40*b*. The motor-side main face 40*a* faces the case opening 23*a* of the stator case 23. The motor-side main face 40*a* closes the case opening 23*a*. The motor-side main face 40*a* is in contact with the path block 24. The compressor-side rear face 40*b* faces the compressor 10. The compressor-side rear face 40*b* forms a passage for the compressed air.

The diffuser plate 40 is a single disc-like component. The diffuser plate 40 is composed of two discs. The materials of the two discs forming the diffuser plate 40 are different from each other. In one example, the diffuser plate 40 has a first disc member 40S and a second disc member 40K. The first disc member 40S includes the motor-side main face 40*a*. The second disc member 40K includes the compressor-side rear face 40*b*. A thermal conductivity of the material forming the first disc member 40S is different from a thermal conductivity of the material forming the second disc member 40K. A thermal conductivity of the first disc member 40S is higher than a thermal conductivity of the second disc member 40K. Heat transfer from the electric motor 20 to the motor-side main face 40*a* and heat transfer from the compressor 10 to the compressor-side rear face 40*b* may be made to be different by the two discs being formed of materials having different thermal conductivity. The diffuser plate 40 promotes heat transfer from the electric motor 20 side to the motor-side main face 40*a*, which has a higher thermal conductivity. That is, the diffuser plate 40 is capable of promoting heat transfer from the stator 22 that forms the electric motor 20. The diffuser plate 40 is capable of suppressing heat transfer from the compressor 10 side to the compressor-side rear face 40*b*, which has a lower thermal conductivity.

The diffuser plate 40 is thermally connected (or thermally coupled) to the second end face 22*b* of the stator 22. In one example, the diffuser plate 40 is in contact with the second end face 22*b*. In another example, the diffuser plate 40 may be spaced from the second end face 22*b*. A space between the diffuser plate 40 and the second end face 22*b* is filled with a thermally conductive material such as thermal grease.

A second passage F2 for a cooling medium is formed in the diffuser plate 40. A hole and a groove forming the second passage F2 are formed in at least one of the first disc member 40S including the motor-side main face 40*a* and the second disc member 40K including the compressor-side rear face 40*b*. The first disc member 40S is in watertight contact with the second disc member 40K to seal the second passage F2. The second passage F2 is formed inside the diffuser plate 40. The cooling medium may be cooling water for example, and flows through the second passage F2. As a result, the second end face 22*b* of the stator 22 is cooled.

The path block 24 couples the first passage F1 to the second passage F2. In one example, the path block 24 allows a cooling medium to flow from the first passage F1 to the second passage F2 via a through hole 24H1 (cf. FIG. 6). The path block 24 also allows the cooling medium to flow from the second passage F2 to the first passage F1 via the through hole 24H1. The motor casing 25 has a supply port and a discharge port for the cooling medium.

Figure 2:
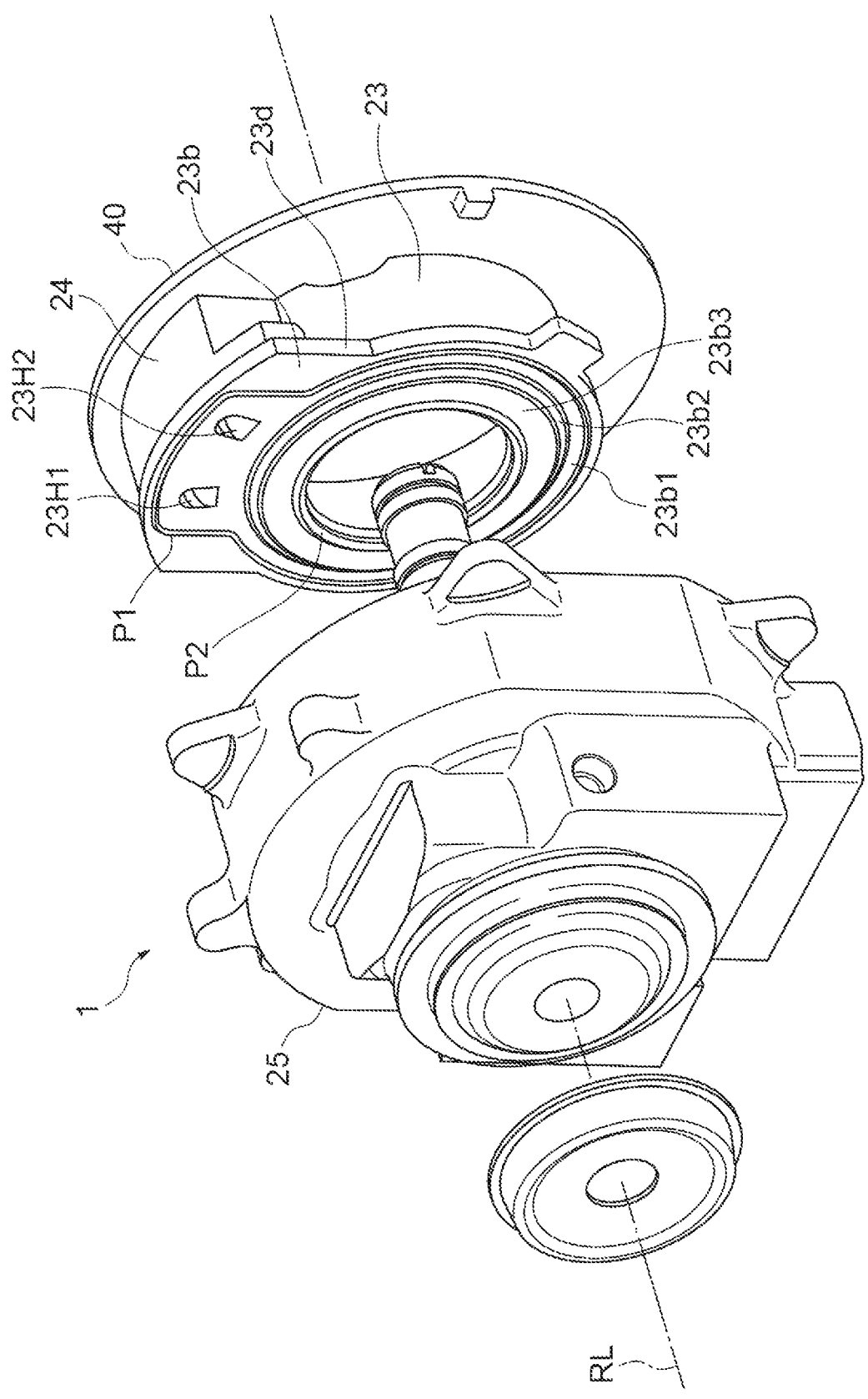
FIG. 2 is an exploded perspective view illustrating an example electric turbocharger.

FIG. 2 is an exploded perspective view illustrating an example of the electric turbocharger 1. The case end face 23*b* has a first annular portion 23*b*1, a second annular portion 23*b*2, a third annular portion 23*b*3, a through hole 23H1, and a through hole 23H2. A packing P1 and a packing P2 are disposed on the case end face 23*b*.

The first annular portion 23*b*1 includes a substantially annular surface, and a surface that follows along the shape of an end face of the case rib 23*d*. The second annular portion 23*b*2 is positioned on an inner circumference of the first annular portion 23*b*1. The second annular portion 23*b*2 is an annular edge. The second annular portion 23*b*2 protrudes toward the motor casing 25 with the first annular portion 23*b*1 as the base end. The third annular portion 23*b*3 is positioned on an inner circumference of the second annular portion 23*b*2. The third annular portion 23*b*3 is a surface that is continuous with an end of the second annular portion 23*b*2 oriented toward the motor casing 25, and formed parallel to the first annular portion 23*b*1. The first annular portion 23*b*1, the second annular portion 23*b*2, and the third annular portion 23*b*3 each surround an axis of rotation RL.

The through hole 23H1 is a hole that passes from one end face to the other end face of the case rib 23*d*. The through hole 23H2 is also a hole that passes from one end face to the other end face of the case rib 23*d*. The through hole 23H1 is one of an outlet for the cooling medium to the path block 24 and an inlet of the cooling medium from the path block 24. The through hole 23H2 is the other of the outlet for the cooling medium to the path block 24 and the inlet for the cooling medium from the path block 24.

The packing P1 and the packing P2 are sealing members such as rubber. The packing P1 is disposed along an outer circumference of the first annular portion 23*b*1. The packing P2 is disposed along an inner circumference of the third annular portion 23*b*3.

Figure 3:
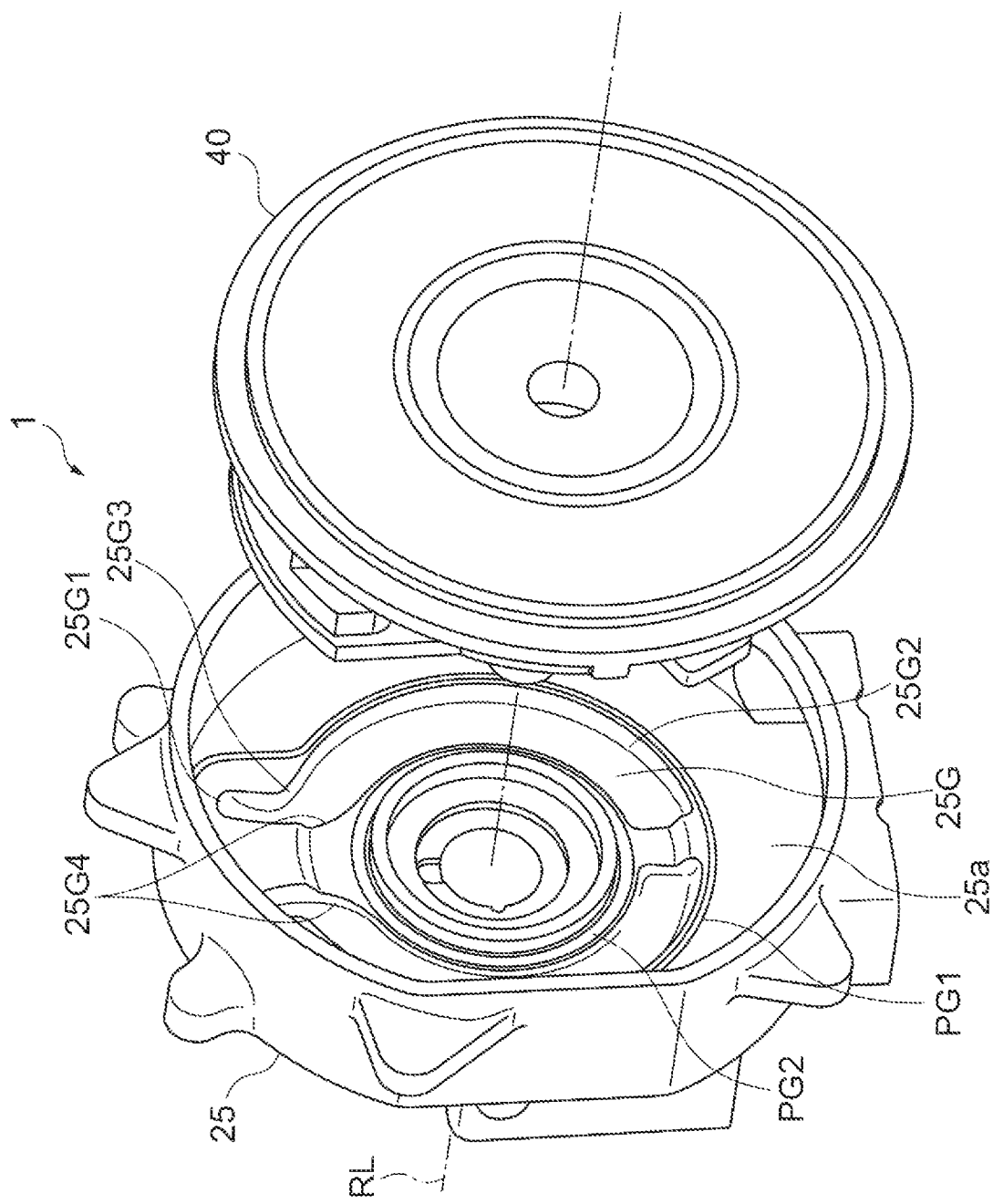
FIG. 3 is an exploded perspective view of FIG. 2 viewed from another direction.

FIG. 3 is an exploded perspective view illustrating an example of the electric turbocharger 1 viewed from a direction different from that of FIG. 2. The wall face 25*a* of the motor casing 25 has a passage groove 25G, a packing groove PG1, and a packing groove PG2. The passage groove 25G forms the first passage F1. The passage groove 25G includes inlet outlet portions 25G1, an annular groove portion 25G2, coupling groove portions 25G3, and pocket portions 25G4. The passage groove 25G is annularly formed to substantially surround the axis of rotation RL. The passage groove 25G may be positioned on an outer circumferential side of the coil end in a plan view in a direction of the axis of rotation RL. The coil end is exposed from the first end face 22*a* of the stator 22. The passage groove 25G may overlap the coil end.

The inlet outlet portions 25G1 are ends of the passage groove 25G. The passage groove 25G is formed, for example, of two recesses. The inlet outlet portion 25G1 is coupled to the through hole 23H1 formed in the case end face 23*b*. The inlet outlet portion 25G1 is also coupled to the through hole 23H2 formed in the case end face 23*b*.

The annular groove portion 25G2 is an annular groove. The annular groove portion 25G2 extends around the axis of rotation RL with a central angle of 180 degrees or more. The annular groove portion 25G2 is positioned on an inner circumference of the packing groove PG1. The annular groove portion 25G2 is positioned on an outer circumference of the packing groove PG2.

The coupling groove portions 25G3 couple the inlet outlet portions 25G1 to the annular groove portion 25G2. The coupling groove portions 25G3 may be omitted in a case in which the inlet outlet portions 25G1 are not spaced from the annular groove portion 25G2, but are formed on the annular groove portion 25G2.

The pocket portions 25G4 are two recesses continuously formed with the annular groove portion 25G2. The two pocket portions 25G4 are formed to face each other. A distance from one of the pocket portions 25G4 to the other of the pocket portions 25G4 is less than a spacing between the two inlet outlet portions 25G1. The spacing through which the pocket portions 25G4 allow the cooling medium to flow is narrower than the spacing between the inlet from the path block 24 and the outlet to the path block 24.

The packing groove PG1 corresponds to the packing P1 of the case end face 23b of the stator case 23. The packing groove PG2 corresponds to the packing P2. The passage groove 25G is positioned between the packing groove PG1 and the packing groove PG2. When the motor casing 25 is in contact with the stator case 23, the packing P1 is fixed to the packing groove PG1, so as to form a seal. When the motor casing 25 is in contact with the stator case 23, the packing P2 is fixed to the packing groove PG2 so as to form a seal. As a result, the motor casing 25 and the stator case 23 are capable of keeping the passage groove 25G watertight.

Figure 4:
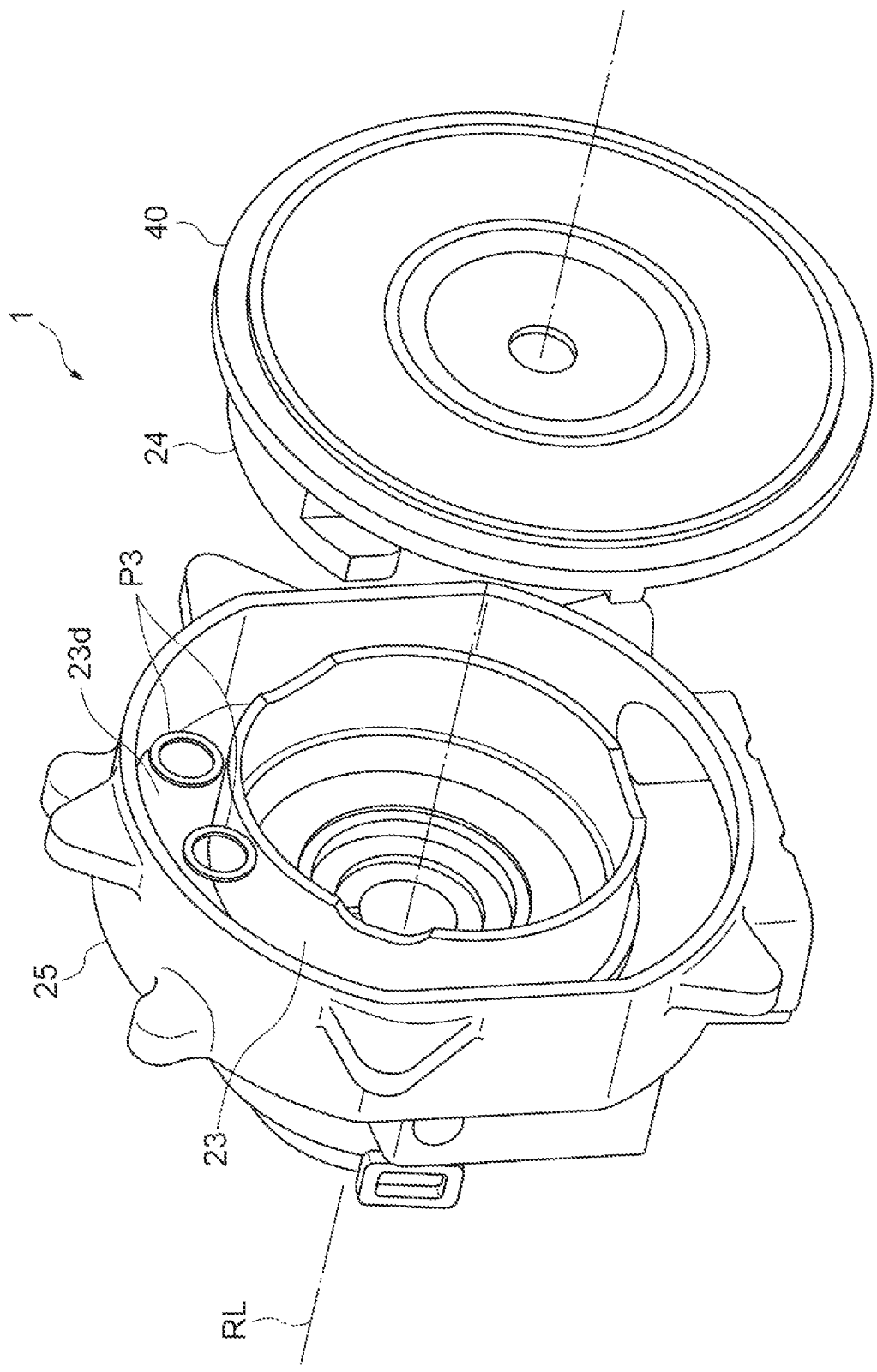
FIG. 4 is an exploded perspective view illustrating an example electric turbocharger.

FIG. 4 is an exploded perspective view illustrating an example of the electric turbocharger 1. FIG. 4 illustrates the motor casing 25 in contact with the stator case 23. Packings P3 are provided on the case rib 23d. The packings P3 are disposed between the case rib 23d and the path block 24.

Figure 5:
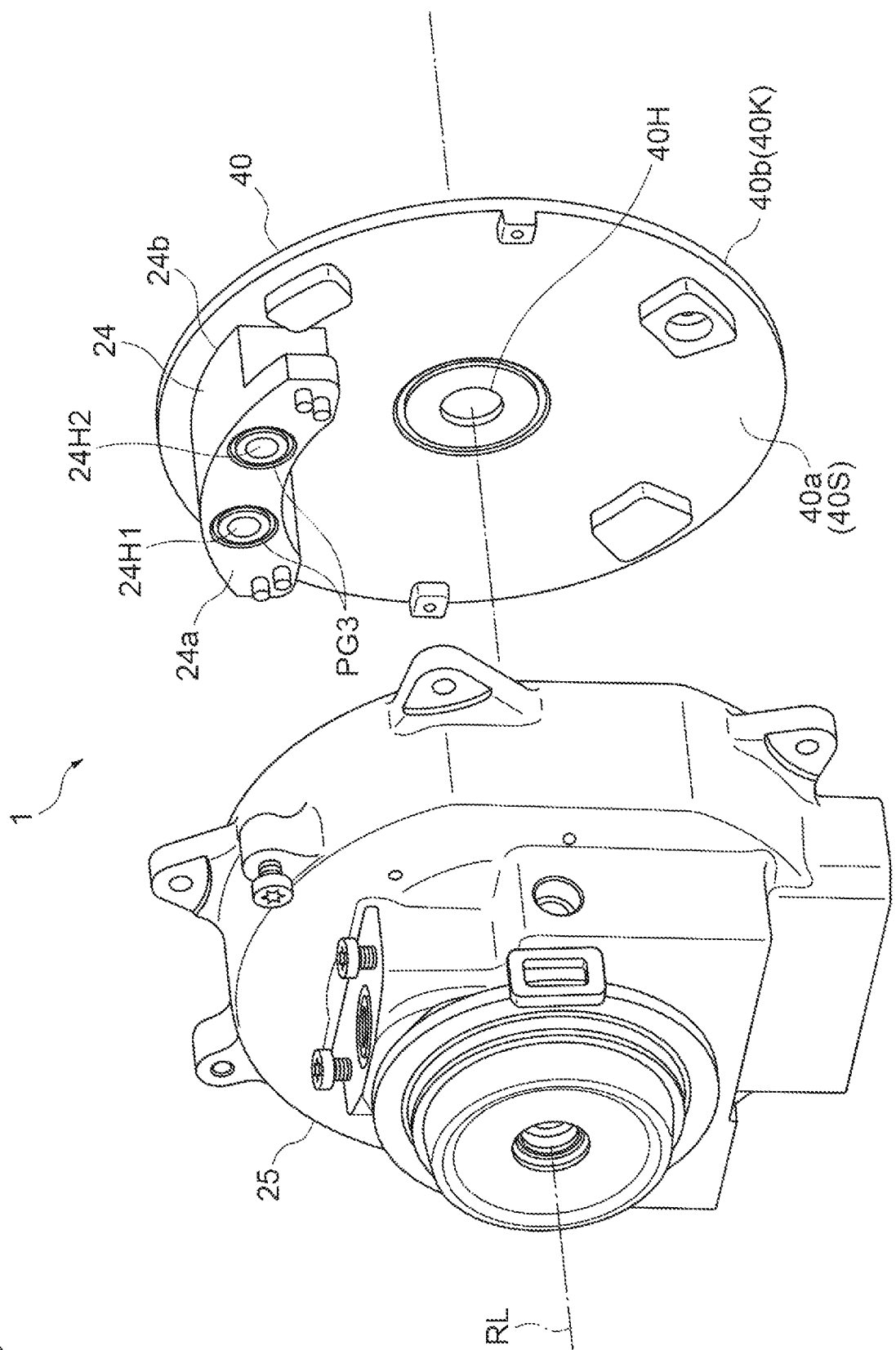
FIG. 5 is an exploded perspective view of FIG. 4 viewed from another direction.

FIG. 5 is an exploded perspective view illustrating an example of the electric turbocharger 1 from a direction different from that of FIG. 4. The path block 24 includes the through hole 24H1, a through hole 24H2, and packing grooves PG3. The through hole 24H1 forms a coupling passage F3a. The through hole 24H2 forms an introduction passage F3b.

The through hole 24H1 passes from the block main face 24a to the block rear face 24b. The through hole 24H2 also passes from the block main face 24a to the block rear face 24b. The through hole 24H1 is one of the outlet for the cooling medium to the path block 24 and the inlet for the cooling medium from the path block 24. The through hole 24H2 is the other of the outlet of the cooling medium to the path block 24 and the inlet of the cooling medium from the path block 24. With further reference to FIG. 2, the through hole 23H1 is formed in the case rib 23d of the stator case 23. The through hole 23H1 is coupled to the through hole 24H1 on the block main face 24a side. The through hole 23H2 is formed on the case rib 23d of the stator case 23. The through hole 23H2 is coupled to the through hole 24H2 on the block main face 24a side. The through holes 24H1 and 24H2 on the block rear face 24b side are respectively coupled to inlet outlet portions 40G1 (described further below) formed in the diffuser plate 40.

The packing grooves PG3 correspond to the packings P3. The packings P3 are disposed between the case rib 23d and the path block 24. The packing groove PG3 is provided on an outer circumference of the through hole 24H1. The packing groove PG3 is also provided on an outer circumference of the through hole 24H2. When the case rib 23d is in contact with the path block 24, the packings P3 are fixed to the packing grooves PG3. The case rib 23d and the path block 24 are capable of keeping the through hole 24H1 watertight by the packing P3 being fixed. The case rib 23d and the path block 24 are also capable of keeping the through hole 24H2 watertight.

The diffuser plate 40 has a through hole 40H formed therein. The through hole 40H extends from the motor-side main face 40a to the compressor-side rear face 40b. A center of the through hole 40H matches the axis of rotation RL.

Figure 6:
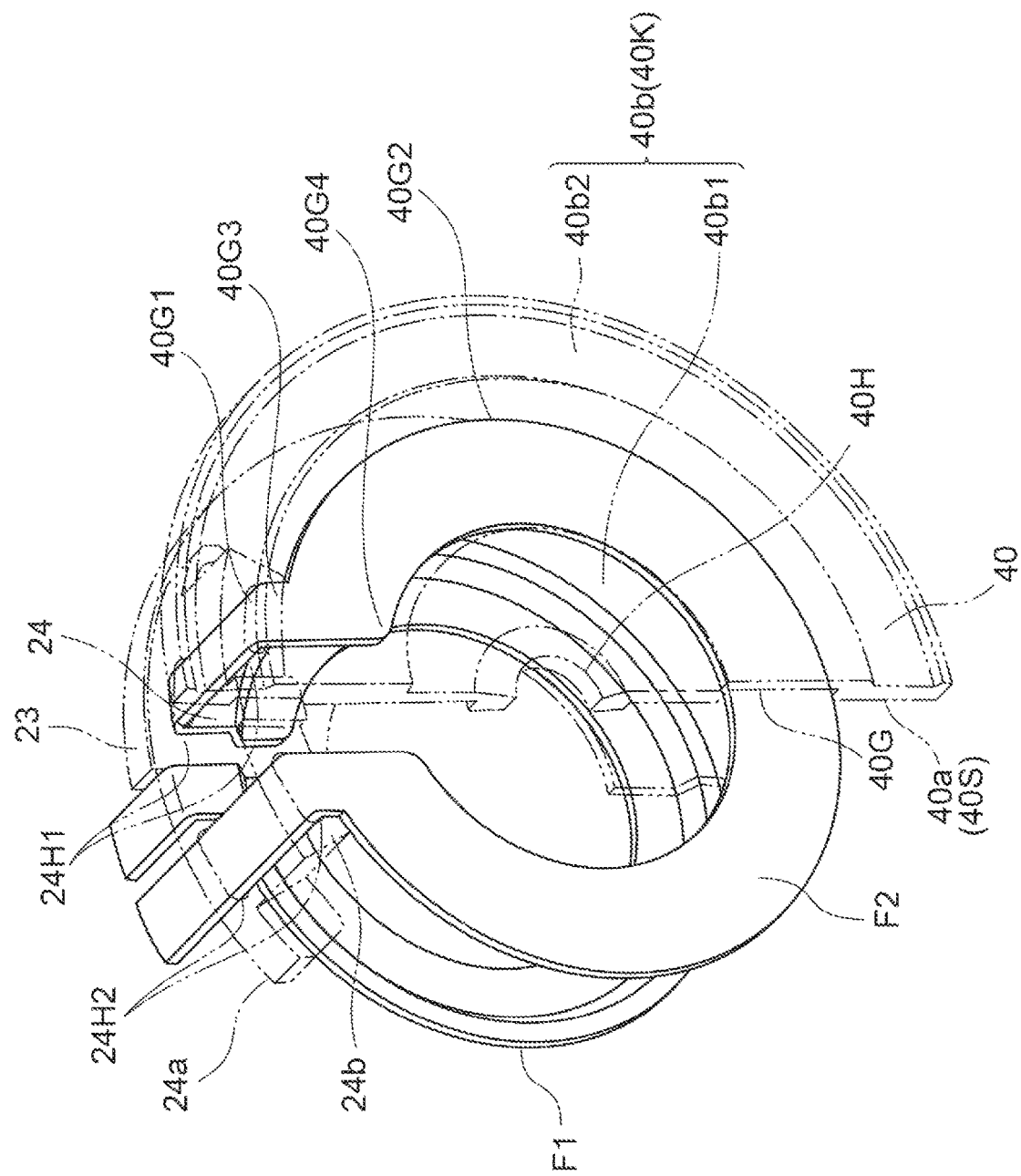
FIG. 6 is a cross-sectional view schematically illustrating the relationship between a diffuser plate and a path block.

FIG. 6 is a cross-sectional view schematically illustrating the relationship between the diffuser plate 40 and the path block 24. As described above, the diffuser plate 40 is formed as a single disc-like component by bonding two discs. The two discs refer to the first disc member 40S including the motor-side main face 40a and the second disc member 40K including the compressor-side rear face 40b. The following description assumes that a groove and a hole for the second passage F2 are formed in the first disc member 40S.

A passage groove 40G is provided in the diffuser plate 40. The passage groove 40G forms the second passage F2. The passage groove 40G includes the inlet outlet portions 40G1, an annular groove portion 40G2, coupling groove portions 40G3, and pocket portions 40G4. The passage groove 40G is annularly formed to substantially surround the axis of rotation RL. The passage groove 40G may be positioned on an outer circumferential side of the coil end in a plan view in the direction of the axis of rotation RL. The coil end is exposed from the second end face 22b of the stator 22. The passage groove 40G may overlap the coil end.

The compressor-side rear face 40b includes an impeller region 40b1 and a diffuser region 40b2. The impeller region 40b1 faces the impeller 11 of the compressor 10. The diffuser region 40b2 forms a passage for the compressed air together with the compressor 10. The diffuser region 40b2 substantially surrounds the impeller region 40b1.

The inlet outlet portions 40G1 are ends of the passage groove 40G. The inlet outlet portions 40G1 are formed, for example, of two recesses. The through hole 24H1 and the through hole 24H2 are formed in the block rear face 24b.

The annular groove portion 40G2 is an annular groove. The annular groove portion 40G2 substantially surrounds the axis of rotation RL with a central angle of 180 degrees or more.

The coupling groove portions 40G3 couple the inlet outlet portions 40G1 to the annular groove portion 40G2. The coupling groove portions 40G3 may be omitted in a case in which the inlet outlet portions 40G1 are not spaced from the annular groove portion 40G2, but are formed on the annular groove portion 40G2.

The pocket portions 40G4 are two recesses continuously formed with the annular groove portion 40G2. The pocket portions 40G4 are formed to face each other at a spacing smaller than a spacing between the two inlet outlet portions 40G1. The spacing through which the pocket portions 40G4 allow the cooling medium to flow is smaller than the spacing between the inlet from the path block 24 and the outlet to the path block 24.

FIGS. 7A and 7B are diagrams schematically illustrating an example of a passage. Referring to FIG. 7A, the motor casing 25, the stator case 23, the path block 24, and the diffuser plate 40 are in watertight contact with each other. FIG. 7B schematically illustrates that the first passage F1, the second passage F2, the coupling passage F3a, and the introduction passage F3b, form a continuous passage.

FIG. 7B illustrates an example of the first passage F1, the second passage F2, the coupling passage F3a, and the introduction passage F3b. The first passage F1 runs along the first end face 22a of the stator 22 and at least a portion of a side surface of the stator 22. The first passage F1 extends toward the second end face 22b of the stator 22. The first passage F1 has a passage body portion F1s, a first accessory passage portion F1r1, and a second accessory passage portion F1r2. A distance from one end of the passage body portion F1s to the other end of the passage body portion F1s around the axis of rotation RL is smaller than a distance from the first accessory passage portion F1r1 to the second accessory passage portion F1r2. This is because the passage body portion F1s is provided with the pocket portions 25G4 (cf. FIG. 3).

The passage body portion F1s includes an outer passage portion F1a, an intermediate passage portion F1b, and an inner passage portion F1c. The first accessory passage portion F1r1 is coupled to one end of the passage body portion F1s. The second accessory passage portion F1r2 is coupled to the other end of the passage body portion F1s.

The outer passage portion F1a substantially surrounds the axis of rotation RL. The outer passage portion F1a is offset relative to the inner passage portion F1c in the direction of the axis of rotation RL. A distance from the outer passage portion F1a to the compressor 10 is shorter than a distance from the inner passage portion F1c to the compressor 10. The outer passage portion F1a is formed by the passage groove 25G and the first annular portion 23b1. The passage groove 25G is formed on the wall face 25a. The first annular portion 23b1 is formed on the case end face 23b.

The intermediate passage portion F1b is provided between the inner passage portion F1c and the outer passage portion F1a. The intermediate passage portion F1b connects the inner passage portion F1c to the outer passage portion F1a. The intermediate passage portion F1b thus extends obliquely relative to the direction of the axis of rotation RL. The intermediate passage portion F1b is formed by the passage groove 25G and the second annular portion 23b2.

The inner passage portion F1c substantially surrounds the axis of rotation RL. The inner passage portion F1c is formed by the passage groove 25G and the third annular portion 23b3. The intermediate passage portion F1b and the inner passage portion F1c run along the first end face 22a of the stator 22 and at least a portion of the side surface of the stator 22. The intermediate passage portion F1b and the inner passage portion F1c extend toward the second end face 22b of the stator 22.

The cooling medium flows into the first passage F1 from a supply port FS. The entering cooling medium flows through the introduction passage F3b, the second passage F2, and the coupling passage F3a in that order. The cooling medium is discharged from a discharge port FV. The supply port FS and the discharge port FV are provided in the motor casing 25.

The first passage F1 and the second passage F2 substantially surround the axis of rotation RL. The first passage F1 and the second passage F2 are annular. A projection area of the first passage F1 viewed in the direction of the axis of rotation RL is different from a projection area of the second passage F2. An outer diameter of the second passage F2 is greater than an outer diameter of the first passage F1 when viewed in the direction of the axis of rotation RL. An inner diameter of the second passage F2 may be smaller than an inner diameter of the first passage F1 when viewed in the direction of the axis of rotation RL. A surface area of a surface of the second passage F2 facing the second end face 22b of the stator 22 is different from a surface area of a surface of the first passage F1 facing the first end face 22a of the stator 22. The surface area of the second passage F2 may be larger than the surface area of the first passage F1.

The electric turbocharger 1 includes the electric motor 20 that has a stator 22 disposed on a circumference about the axis of rotation RL, a stator case 23 (first member) that holds the stator 22 and is thermally connected to the first end face 22a of the stator 22 in the direction of the axis of rotation RL of the electric motor 20, the diffuser plate 40 (second member) that is thermally connected to the second end face 22b of the stator 22 in the direction of the axis of rotation RL, and the motor casing 25 (third member) that is in contact with the stator case 23. The stator case 23 and the motor casing 25 cooperate to form the first passage F1 that substantially surrounds the axis of rotation RL and is disposed on the first end face 22a side. The diffuser plate 40 having the second passage F2 that substantially surrounds the axis of rotation RL, is disposed on a side of the second end face 22b, and is spaced from the first passage F1 in the direction of the axis of rotation RL.

An electric current for generating a rotating magnetic field is supplied to the stator 22 of the electric turbocharger 1. The stator 22 generates heat due to the supplied electric current. The stator case 23 is thermally connected to the first end face 22a of the stator 22. The stator case 23 (first member) and the motor casing 25 (third member) cooperate to form the first passage F1. The electric turbocharger 1 enables heat to be removed from the first end face 22a of the stator 22 by supplying a cooling medium to the first passage F1. The diffuser plate 40 (second member) is thermally connected to the second end face 22b of the stator 22. The diffuser plate 40 has the second passage F2. The electric turbocharger 1 enables heat to be removed from the second end face 22b of the stator 22 by supplying a cooling medium to the second passage F2. The electric turbocharger 1 thus enables a larger amount of heat to be removed from the stator 22. As a result, the electric turbocharger 1 is capable of further increasing cooling performance.

The main heat source of the electric motor 20 is the stator 22 including the coil. An electric current is supplied to the coil of the electric motor 20 as a power source. When an electric current flows through the coil, heat is generated due to electrical resistance. When the temperature of the electric motor 20 rises due to the generation of heat, the magnet forming the electric motor 20 is demagnetized. As a result, the output of the electric motor 20 may be reduced. There is thus a need to cool the electric motor 20. The electric turbocharger 1 includes a cooling mechanism which includes the first passage F1 and the second passage F2. The cooling mechanism employs both end faces of the stator 22 as heat paths. The cooling mechanism efficiently discharges heat, particularly, from the coil ends exposed at the first end face 22a and the second end face 22b of the stator 22.

The electric turbocharger 1 includes the electric motor 20 that has the stator 22, the motor casing 25 that is thermally connected (or thermally coupled) to the first end face 22a of the stator 22, and the diffuser plate 40 that is thermally connected (or thermally coupled) to the second end face 22b of the stator 22. The first passage F1 for a cooling medium is formed in the motor casing 25. The second passage F2 for a cooling medium is formed within the diffuser plate 40.

Coil ends which are ends of the coil are exposed at both end faces of the stator 22. In the electric turbocharger 1, the motor casing 25 in which the first passage F1 is formed is thermally connected to the first end face 22a of the stator 22. The diffuser plate 40 in which the second passage F2 is formed is thermally connected to the second end face 22b of the stator 22. With such configuration, the electric turbocharger 1 enables a cooling medium to flow through the first passage F1 and the second passage F2. As a result, the electric turbocharger 1 is capable of efficiently discharging heat from both end faces of the stator 22. The electric turbocharger 1 is thus capable of further increasing the cooling performance.

The stator case 23 has the case body 23s that contains the stator 22, and the case rib 23d that extends from an outer circumferential surface of the case body 23s. The electric turbocharger 1 further includes the path block 24 that is disposed between the case rib 23d and the diffuser plate 40, which are separated by the case body 23s. The path block 24 has the coupling passage F3a that connects the first passage F1 and the second passage F2 to each other. According to this configuration, the first passage F1 is connected to the second passage F2 by the coupling passage F3a of the path block 24. As a result, the electric turbocharger 1 enables the passages that cool both the first end face 22a and the second end face 22b of the stator 22 to be formed as one passage. The electric turbocharger 1 thus enables the configurations for providing the cooling medium to the passage and discharging the cooling medium from the passage to be simple.

The electric turbocharger 1 may further include the stator case 23 and the path block 24. The stator case 23 holds the stator 22. The path block 24 is disposed between the stator case 23 and the diffuser plate 40, and on the side surface of the stator case 23. Even with such configuration, the electric turbocharger 1 is capable of obtaining good cooling performance. The first passage F1 and the second passage F2 are coupled to form a continuous passage. The electric turbocharger 1 has a simple configuration since there is one supply port FS and one discharge port FV for the cooling medium. The path block 24 is a separate component from the stator case 23. This facilitates the manufacture of the stator case 23. The stator case 23 may be uniformly thermally deformed during shrink fitting compared to a case in which the path block 24 and the stator case 23 are manufactured as the same component. As a result, the electric turbocharger 1 is capable of suppressing reduction in yield due to poor shrink fitting.

The path block 24 further has the introduction passage F3b that directs the cooling medium into the second passage F2 from outside. The coupling passage F3a directs the cooling medium from the second passage F2 to the first passage F1. Even with this configuration, the electric turbocharger 1 enables the configurations for providing the cooling medium to the passage and discharging the cooling medium from the passage to be simple.

A second projection area of the second passage F2 viewed from the axis of rotation RL is different from a first projection area of the first passage F1 viewed from the axis of rotation RL. This configuration enables the electric turbocharger 1 to adjust the balance between the amount of heat to be removed from the stator 22 by the first passage F1 and the amount of heat to be removed from the stator 22 by the second passage F2.

The surface area of the surface of the second passage F2 facing the second end face 22b of the stator 22 is different from the surface area of the surface of the first passage F1 facing the first end face 22a of the stator 22. Even with such configuration, the electric turbocharger 1 is capable of obtaining good cooling performance.

The second projection area of the second passage F2 viewed from the axis of rotation RL is greater than the first projection area of the first passage F1 viewed from the axis of rotation RL. This configuration enables the electric turbocharger 1 to increase the amount of heat to be removed from the stator 22 by the second passage F2 to greater than the amount of heat to be removed from the stator 22 by the first passage F1.

The surface area of the second passage F2 is larger than the surface area of the first passage F1. The diffuser plate 40 receives heat from the air compressed by the compressor impeller at a surface opposite the surface thermally connected to the second end face 22b of the stator 22. The electric turbocharger 1 enables heat to be efficiently removed from the coil ends by increasing the surface area of the passage of the diffuser plate 40. The electric turbocharger 1 is capable of suppressing heat transfer from the compressed air to the second end face 22b of the stator 22. The electric turbocharger 1 is thus capable of further increasing the cooling performance.

The first passage F1 includes the inner passage portion F1c that substantially surrounds the axis of rotation RL, the outer passage portion F1a that substantially surrounds the axis of rotation RL and is offset relative to the inner passage portion F1c in the direction of the axis of rotation RL, and the intermediate passage portion F1b that is provided between the inner passage portion F1c and the outer passage portion F1a, and extends obliquely relative to the direction of the axis of rotation RL. This configuration enables the electric turbocharger 1 to favorably remove heat from the first end face 22a of the stator 22.

The first passage F1 is provided along the first end face 22a of the stator 22 and at least a portion of the side surface of the stator 22 to extend toward the second end face 22b of the stator 22. According to such configuration, the first passage F1 is formed from the first end face 22a to the side surface of the stator 22, on the first end face 22a side. As a result, the electric turbocharger 1 enables the cooling medium to flow in a location closer to the coil ends. The electric turbocharger 1 is thus capable of further increasing the cooling performance.

The first passage F1 has the passage body portion F1s that includes the inner passage portion F1c, the intermediate passage portion F1b, and the outer passage portion F1a, the first accessory passage portion F1r1 that extends from one end of the passage body portion F1s in a direction intersecting the axis of rotation RL, and the second accessory passage portion F1r2 that extends from the other end of the passage body portion F1s in the direction intersecting the axis of rotation RL. The distance from one end of the passage body portion F1s to the other end of the passage body portion F1s around the axis of rotation RL is smaller than the distance from the first accessory passage portion F1r1 to the second accessory passage portion F1r2. This configuration enables the electric turbocharger 1 to more favorably remove heat from the first end face 22a of the stator 22.

The pocket portions 25G4, which allow the cooling medium to flow at a spacing narrower than the spacing between the inlet from the path block 24 and the outlet to the path block 24, are formed in the diffuser plate 40. When the passages on both sides of the stator 22 are coupled, the cooling medium may not flow for the amount of the spacing between the inlet from the path block 24 and the outlet to the path block 24 in the passage of the diffuser plate 40. In the electric turbocharger 1, the passage of the diffuser plate 40 is enlarged by the pocket portions 25G4. The electric turbocharger 1 is thus capable of further increasing the cooling performance.

The motor casing 25 has the supply port FS and the discharge port FV for the cooling medium of the second passage F2. Even with such configuration, the electric turbocharger 1 is capable of obtaining good cooling performance. The motor casing 25 has a sufficient volume of space compared to the diffuser plate 40. The electric turbocharger 1 thus enables the supply port FS and the discharge port FV of the cooling medium of the second passage F2 to be easily disposed.

It is to be understood that not all aspects, advantages and features described herein may necessarily be achieved by, or included in, any one particular example. Indeed, having described and illustrated various examples herein, it should be apparent that other examples may be modified in arrangement and detail.

For example, although it has been described that the motor casing 25 cooperates with the stator case 23 to form the first passage F1 in the examples, a groove and a hole that form the first passage F1 may be formed in either the motor casing 25 or the stator case 23.

Additionally, although the stator case 23 has been described as the first member that is in contact with the first end face 22a of the stator 22 in the examples above and the motor casing 25 has been described as the third member that is in contact with the stator case 23 the first member, the second member, and the third member are not limited to the examples above. For example, the first member that is in contact with the first end face 22a of the stator 22 may be a motor casing. The third member that is in contact with a motor casing may be a stator case.

The invention claimed is:

1. An electric turbocharger comprising:
an electric motor having a stator disposed annularly about an axis of rotation;
a stator case thermally coupled to a first end face of the stator in a direction of the axis of rotation, wherein the stator case has a case body containing the stator, and a case rib extending from an outer circumferential surface of the case body;
a casing member in contact with the stator case, wherein the stator case and the casing member form a first passage substantially surrounding the axis of rotation and disposed on a side of the first end face;
a diffuser plate that is thermally coupled to a second end face of the stator in the direction of the axis of rotation and that is spaced apart from the case rib by the case body of the stator case; and
a path block disposed between the case rib and the diffuser plate,
wherein the diffuser plate has a second passage substantially surrounding the axis of rotation,
wherein the second passage is disposed on a side of the second end face so as to be spaced apart from the first passage in the direction of the axis of rotation, and
wherein the path block has a coupling passage connecting the first passage to the second passage.

2. The electric turbocharger according to claim 1,
wherein the casing member is a motor casing containing the stator case, and
wherein the first passage is formed between the motor casing and the stator case in the direction of the axis of rotation.

3. The electric turbocharger according to claim 1,
wherein the path block further has an introduction passage configured to direct a cooling medium to the second passage from outside, and
wherein the coupling passage is configured to direct the cooling medium from the second passage to the first passage.

4. The electric turbocharger according to claim 1, wherein a cross-sectional area of the second passage taken orthogonally to the axis of rotation is greater than a cross-sectional area of the first passage taken orthogonally to the axis of rotation.

5. The electric turbocharger according to claim 1,
wherein the first passage includes an inner passage portion substantially surrounding the axis of rotation, an outer passage portion substantially surrounding the axis of rotation and offset relative to the inner passage portion in the direction of the axis of rotation, and an intermediate passage portion provided between the inner passage portion and the outer passage portion, and
wherein the inner passage portion, the intermediate passage portion and the outer passage portion are arranged radially relative to the axis of rotation.

6. The electric turbocharger according to claim 5,
wherein the first passage has a passage body portion including the inner passage portion, the intermediate passage portion, and the outer passage portion, a an inlet passage portion extending from one end of the passage body portion in a radial direction intersecting the axis of rotation, and an outlet passage portion extending from another end of the passage body portion in the radial direction intersecting the axis of rotation, and
wherein a distance from the one end of the passage body portion to the other end of the passage body portion around the axis of rotation is less than a distance from the inlet passage portion to the outlet passage portion.

7. The electric turbocharger according to claim 1,
wherein the stator case is in contact with the first end face of the stator,
wherein the second passage of the diffuser plate has an annular portion that substantially surrounds the axis of rotation,
wherein the diffuser plate has a contact surface that is in contact with the second end face of the stator, and a port configured to fluidly couple the annular portion of the second passage with the first passage, and
wherein the port is formed in the contact surface at a position located radially outwardly of the annular portion.

8. The electric turbocharger according to claim 1,
wherein the second passage has an annular portion that extends around the rotation axis,
wherein the diffuser plate forms a port that fluidly couples the annular portion with the first passage, and
wherein the port is located radially outwardly of the annular portion of the second member.

9. An electric turbocharger comprising:
an electric motor including a stator disposed annularly about a rotation axis, wherein the stator has a first end face and a second end face opposite the first end face in a direction of the rotation axis;
a first member thermally coupled with the first end face of the stator to form a first cooling passage that extends around the rotation axis; and
a second member thermally coupled with the second end face of the stator,
wherein the second member accommodates a second cooling passage having an annular portion that extends around the rotation axis,
wherein the second member forms a port that fluidly couples the annular portion with the first cooling passage, and
wherein the port is located radially outwardly of the annular portion of the second cooling passage.

10. The electric turbocharger according to claim 9,
wherein the first member is a stator case that accommodates the stator,
wherein the stator case has a first end surface in the direction of the rotation axis, located adjacent to the first end of the stator, and a second end surface located opposite to the first end surface of the stator case, in the direction of the rotation axis, and wherein the electric turbocharger further includes a motor casing that is in sealing contact with the stator case to form the first cooling passage between the first end surface of the stator case and the motor casing.

11. The electric turbocharger according to claim 9, wherein the second member is a diffuser plate having a main surface facing the second end of the stator, wherein the annular portion of the second cooling passage extends within the diffuser plate, and wherein the port is formed in the main surface of the diffuser plate.

12. The electric turbocharger according to claim 9, wherein the first cooling passage includes a first annular portion located adjacent to the first end face of the stator, and a first passage portion extending radially outwardly from the first annular portion, that is formed by the first member, wherein the annular portion of the second cooling passage is a second annular portion located adjacent to the second end face of the stator, wherein the second cooling passage further includes a second passage portion formed by the second member, that extends radially outwardly from the second annular portion to the port, and wherein the second cooling passage is spaced apart from the first cooling passage via a coupling passage that extends from the first passage portion to the second passage portion in the direction of the rotation axis.

13. The electric turbocharger according to claim 9, further comprising a coupling passage that extends in the direction of the rotation axis from the first cooling passage to the port of the second member forming the second cooling passage.

14. The electric turbocharger according to claim 13, wherein the first cooling passage, the coupling passage and the second cooling passage are connected to form a continuous passage, wherein the continuous passage has an inlet and an outlet to direct a cooling medium through the continuous passage, wherein the electric turbocharger further comprises a path block located radially outwardly of the stator, and wherein the path block accommodates the coupling passage and at least one of the inlet or the outlet of the continuous passage.

15. The electric turbocharger according to claim 9, wherein the first cooling passage has a first cross-sectional area in a first transverse cross-section of the electric turbocharger that is orthogonal to the rotation axis, and wherein the second cooling passage has a second cross-sectional area in a second transverse cross-section of the electric turbocharger, that is different from greater than the first cross-sectional area.

16. The electric turbocharger according to claim 9, wherein the first cooling passage includes an inner annular portion and an outer annular portion that is located radially outwardly of the inner annular portion relative to the rotation axis, and wherein the outer annular portion is offset from the inner annular portion in the direction of the rotation axis.

17. The electric turbocharger according to claim 9, wherein the first cooling passage includes an annular portion that substantially surrounds the rotation axis, and wherein the first cooling passage further includes an inlet passage portion extending radially outwardly from a first end of the annular portion and an outlet passage portion extending radially outwardly from a second end of the annular portion, so that a distance between the inlet passage portion and the outlet passage portion is greater than a distance between the first end and the second end of the annular portion.

18. The electric turbocharger according to claim 9, wherein the first member is in contact with the first end face of the stator and the second member is in contact with the second end face of the stator.

19. An electric turbocharger comprising:
an electric motor including a stator disposed annularly about a rotation axis, wherein the stator has a first end face and a second end face opposite the first end face in a direction of the rotation axis;
a first member thermally coupled with the first end face of the stator to form a first cooling passage that extends around the rotation axis; and
a second member thermally coupled with the second end face of the stator,
wherein the first cooling passage includes an inner annular portion and an outer annular portion that is located radially outwardly of the inner annular portion relative to the rotation axis,
wherein the outer annular portion is offset from the inner annular portion in the direction of the rotation axis, and
wherein the second member accommodates a second cooling passage that extends around the rotation axis.

20. The electric turbocharger according to claim 19, wherein the first cooling passage includes an annular portion that substantially surrounds the rotation axis, and wherein the first cooling passage further includes an inlet passage portion extending radially outwardly from a first end of the annular portion and an outlet passage portion extending radially outwardly from a second end of the annular portion, so that a distance between the inlet passage portion and the outlet passage portion is greater than a distance between the first end and the second end of the annular portion.

* * * * *